US010983193B2

(12) United States Patent
Lin et al.

(10) Patent No.: US 10,983,193 B2
(45) Date of Patent: Apr. 20, 2021

(54) COMMUNICATION UNIT, INTEGRATED CIRCUITS AND METHODS FOR CASCADING INTEGRATED CIRCUITS

(71) Applicant: NXP B.V., Eindhoven (NL)

(72) Inventors: Yu Lin, Utrecht (NL); Marcello Ganzerli, Eindhoven (NL); Mingda Huang, Beijing (CN)

(73) Assignee: NXP B.V., Eindhoven (NL)

(*) Notice: Subject to any disclaimer, the term of this patent is extended or adjusted under 35 U.S.C. 154(b) by 303 days.

(21) Appl. No.: 16/174,997

(22) Filed: Oct. 30, 2018

(65) Prior Publication Data

US 2019/0178983 A1   Jun. 13, 2019

(30) Foreign Application Priority Data

Dec. 13, 2017   (EP) .................................... 17207040

(51) Int. Cl.
*G01S 7/03* (2006.01)
*G01S 13/931* (2020.01)
(Continued)

(52) U.S. Cl.
CPC ................ *G01S 7/032* (2013.01); *G01S 7/40* (2013.01); *G01S 7/4021* (2013.01);
(Continued)

(58) Field of Classification Search
CPC . G01S 7/32; G01S 7/40; G01S 7/4021; G01S 13/003; G01S 13/34; G01S 13/865; G01S 13/87; G01S 13/878; G01S 13/931
(Continued)

(56) References Cited

U.S. PATENT DOCUMENTS 7,409,022 B2   8/2008   Dai et al.
8,494,030 B2   7/2013   Rofougaran
(Continued)

FOREIGN PATENT DOCUMENTS

EP   2244098 A1   10/2010

OTHER PUBLICATIONS

Chen, C., "Wireless Synchronization of mm-wave Arrays in 65nm CMOS", IEEE Custom Integrated Circuits Conference (CICC), pp. 1-4, 2015.
(Continued)

*Primary Examiner* — Bo Fan

(57) ABSTRACT

A communication unit, such as a radar unit (500) includes a plurality of cascaded millimetre wave, mmW, transceiver, TRx, circuit, each comprising at least one phase shift circuit (616) and each coupled to respective antennas; and a signal processor circuit (552) operably coupled to the plurality of cascaded mmW TRx circuits and configured to process transmit and receive signals of the plurality of cascaded mmW TRx circuits. The radar unit (500) further comprises: a first TRx circuit (320) of the plurality of cascaded mmW TRx circuits being configured to wirelessly transmit (360) a signal to a second TRx circuit (322) via a respective antenna; a localization processing circuit (580) operably coupled to at least one of the first TRx circuit (320) and second TRx circuit (322) and configured to wirelessly determine a distance relationship (350) between at least one antenna coupled to the first TRx circuit (320) and at least one antenna coupled to the second TRx circuit (322); and a phase control unit (602), operably coupled to the localization processing circuit (570) and configured to adjust at least one phase shifter (616) in response to the wirelessly determined distance relationship.

18 Claims, 10 Drawing Sheets

(51) Int. Cl.
*H01Q 1/32* (2006.01)
*H01Q 3/26* (2006.01)
*G01S 13/34* (2006.01)
*G01S 13/87* (2006.01)
*G01S 13/86* (2006.01)
*G01S 7/40* (2006.01)
*G01S 13/00* (2006.01)
*G01S 13/02* (2006.01)
*G01S 13/46* (2006.01)

(52) U.S. Cl.
CPC ............ *G01S 13/003* (2013.01); *G01S 13/34* (2013.01); *G01S 13/865* (2013.01); *G01S 13/87* (2013.01); *G01S 13/878* (2013.01); *G01S 13/931* (2013.01); *H01Q 1/3233* (2013.01); *H01Q 3/267* (2013.01); *G01S 2013/0245* (2013.01); *G01S 2013/0254* (2013.01); *G01S 2013/466* (2013.01); *G01S 2013/93275* (2020.01)

(58) Field of Classification Search
USPC ....................................... 342/70, 82, 137, 41
See application file for complete search history.

(56) References Cited

U.S. PATENT DOCUMENTS

| | | |
|---|---|---|
| 2015/0153445 A1 | 6/2015 | Jansen |
| 2016/0320481 A1 | 11/2016 | Ling et al. |
| 2017/0346575 A1* | 11/2017 | Tang .................... H04B 7/0617 |

OTHER PUBLICATIONS

Morgan, P., "Increasing Automotive Safety with 77/79 GHz Radar Solutions for ADAS Applications", Freescale Technology Forum, Apr. 2014.

Ginsburg, B., "A 160 GHz Pulsed Radar Transceiver in 65 nm CMOS", IEEE Journal of Solid State Circuits, vol. 49, No. 4, Apr. 2014.

Guo, X., "A Receiver with Start-up Initialization and Programmable Delays for Wireless Clock Distribution", Session 21, Advanced Clocking, Logic and Signaling Techniques, 21.4, ISSCC 2006.

Mandlik, M., "An Accuracy Synchronization Method for Passive Radar System", IEEE 2014.

Weib, M., "Synchronisation of Bistatic Radar Systems", IEEE 2004.

Yang, Y., "Some Phase Synchronization Algorithms for Coherent MIMO Radar", 45th Annual Conference on Information Sciences and Systems (CISS), pp. 1-6, IEEE Mar. 23, 2011.

* cited by examiner

FIG. 1 – Prior Art

FIG. 2 – Prior Art

COMMUNICATION UNIT, INTEGRATED CIRCUITS AND METHODS FOR CASCADING INTEGRATED CIRCUITS

CROSS-REFERENCE TO RELATED APPLICATIONS

This application claims the priority under 35 U.S.C. § 119 of European Patent application no. 17207040.1, filed on 13 Dec. 2017, the contents of which are incorporated by reference herein.

FIELD OF THE INVENTION

The field of the invention relates to a communication unit that includes a number of wireless integrated circuits (ICs) and methods for cascading multiple ICs. The invention is applicable to, but not limited to, a radar unit having an adaptive distributed phased array radar system for, say, an automotive application, and methods therefor.

BACKGROUND OF THE INVENTION

There has been an increased demand for active safety systems for vehicles. Active safety systems require multiple radar sensors per vehicle, each radar sensor typically working with a specific radar technology. In an automotive application, the radar sensors are mostly built using a number of integrated circuits (ICs), sometimes referred to as 'chips'. The current trend is towards offering a radar system on chip (SoC, using a radio frequency (RF) complementary metal-oxide-semiconductor (CMOS) process technology) solution in order to reduce cost and power consumption.

Commercial automotive radar sensors typically include multiple receivers and transmitters (the combination of which is referred to as transceivers (TRx)), implemented as a phased array radar system, in order to improve the output power, receiver sensitivity and angular resolution. A microcontroller (MCU) performs digital control of the transceiver circuits and digital signal processing of the digitized data (e.g. fast fourier transform (FFT) and digital signal processing) in order to output processed radar data to a central processing unit (CPU) of the vehicle.

mmWave (RF) circuits are known to have poor power efficiency, especially power amplifiers, with a power added efficiency (PAE) rating of around 10% or lower (for a 77 GHz CMOS radar power amplifier (PA)). Such wasted power generates heat on the chip, due to the so-called self-heating effect. As the junction temperature increases, the lifetime of the ICs is respectively severely affected. This is a main physical constraint of complex SoC (system on chip) implementations in advanced CMOS technology that integrate many functions on a single IC. Therefore, current monolithic radar ICs are typically constrained to contain only a few transceiver channels, as the complexity and cost and heat dissipation problems of integrating more transceiver channels on the same chip increases substantially with the number of ICs that are included.

Frequency-modulated continuous wave (FMCW) radar sensors transmit frequency modulated signals, and radar receivers substantially simultaneously receive their echo. The received echo is then mixed with the transmitted signal and results in a low frequency signal having frequency of: $fb=f_{receive}-f_{transmit}$ at the output of the mixer, the so-called beat frequency (fb). By analysing the beat frequency, the range parameter (i.e. a distance to targets) can be extracted.

Additionally, there are a handful of other radar sensor technologies adopted and installed by leading vehicle manufacturers. Each of these differs in terms of operational principles and typically each radar sensor architecture (and associated radar technology) is supported by a dedicated IC set. It is known that radar systems with a larger number of transceiver units, configured to work in parallel, provide a better angle estimation accuracy and detection range. It is also known that radar customers desire radar transceiver ICs that can support multi-chip cascading for enhancing the precision of the targets localisation and path prediction of their system.

The current solution for multi-chip cascading is based on wired connections amongst multiple chips located on a single printed circuit board (PCB) 100, as illustrated in FIG. 1. In this illustration, a known radar unit cascades two radar TRx chips. One of the radar TRx chips is defined as the master unit 110, which contains a first set of transmitter circuits coupled to transmit antennas 112 and a first set of receiver circuits coupled to receive antennas 114. The master unit 110 is arranged to distribute the Local oscillator (LO) signal 140 off-chip through transmission lines on the PCB 100 to other radar chips (in this case the one other TRx chip functioning as a slave unit 120). The slave unit 120 contains a second set of transmitter circuits coupled to transmit antennas 122 and a second set of receiver circuits coupled to receive antennas 124. The distribution of the LO signal 140 from the master unit 110 ensures that the slave unit 120 is also able to use the LO signal 140, and thereby ensure that the transmitting signal frequency and the clock frequency of the down mixer of different radar TRx are the same. Other control signals may be synchronized with a lower speed clock, for example the ADC clock, which may be used across multiple ICs.

The master unit 110 is coupled to a signal processing circuit, in the form of a microprocessor IC 160, which includes various interfaces, such as a serial-parallel interface 162, a general purpose input-output port 170, two MIPI-alliance camera serial interfaces (MIPI CSIs) 168, as well as 8 sigma-delta modulators 164 in this illustration and a Pulse width modulation (PWM) circuit 166 for generating calibration signals.

Referring now to FIG. 2, a block diagram of a radar unit 200 illustrates a further known example of the cascading of multiple chips/ICs with wired interconnections. These chips/ICs are typically the same, in that they each employ the same antennas coupled to one or multiple transceiver circuits, a phase locked loop (PLL) frequency generation circuit, a MCU, etc. Alternatively, the chips/ICs may operate independently as a small radar system. In this radar unit 200, an antenna radiation pattern 210 is formed from a plurality of radar transceiver chips and antennas 250 located on a radar unit printed circuit board 220. The master radar transceiver unit 230 is only used for generating a common LO signal and multiple control signals for synchronization purposes (as shown in FIG. 1). The master radar transceiver unit 230 requires transmission lines 240 exhibiting equal or known delay, by design. FIG. 2 also illustrates two different antenna radiation patterns of a 4-transceivers array 260 and a 16-transceiver array 270 in a rectangular plot, which shows the advantages of cascading a large number of TRx units.

There are many drawbacks of the architectures of FIG. 1 and/or FIG. 2. For example, all radar transceiver units, including their antennas and RF circuits/components, need to be placed in close proximity with each other using wired connections on the same PCB, i.e. with an accurate predefined distance between array unit antennas (e.g. half of the transmitting signal wavelength). The performance of the RF circuits at the high frequencies that radar systems operate is highly dependent on the accuracy and matching of the dimensions of the transmission lines interconnecting the RF components and circuits. This hampers the scalability of the array size and increases the complexity in the PCB design.

Furthermore, it is known that the LO signal distribution, via wired connections from the master unit to all slave units, needs to have equal length to achieve phase coherence when all the TRx channels are used as one antenna array. In addition, achieving equal delay (or known delays) when distributing LO signals between multiple chips at such high mmWave frequencies is challenging. For example, the LO signal is typically in the tens of GHz (e.g. 36 GHz (½ of the automotive Radar output signal frequency)). Moreover, multiple layers of RF substrate are needed in order to enable mm-wave signal distribution with low loss and well-controlled characteristic impedance, and in order to avoid LO distribution crossing the area of TRx antenna arrays. This invariably leads to higher PCB manufacturing costs and increased complexity. Also, at these high mmWave frequencies, placement and routing accuracy of transmission lines on PCBs is typically +/−20 um, which causes phase mismatch between the radar units of ~+/−3 degrees at 77 GHz. In addition, the LO distribution has to be always active. Hence, special treatment on the electro-magnetic compatibility (EMC) control is required. In a case of cascading chips across different PCBs or modules, high quality and expensive cables/waveguides are needed in order to distribute high frequency signals (e.g. 20-30 GHz or even 77 GHz). Moreover, the distance between antennas is needed to be known accurately in order to form a phased array system.

As also illustrated in FIG. 1, the signals needed to be synchronized in order to enable radar chip cascading include: the LO signal, Tx control and frequency chirp control signals, and data capture clock signals (for analog to digital conversion (ADC) start during the signal conversion). Such signals control the transceiver operation of each radar chip, working at the same frequency ramp so that they can capture the received signals at the same moment. LO frequency and phase synchronization are critical factors in a distributed phased array design. A common phase reference is vital in order to steer the beam and control the radiation pattern for the phased array system.

Thus, a mechanism is needed to better support multiple radar ICs within a radar unit.

SUMMARY OF THE INVENTION

The present invention provides a radar unit, integrated circuit and methods for cascading integrated circuits, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
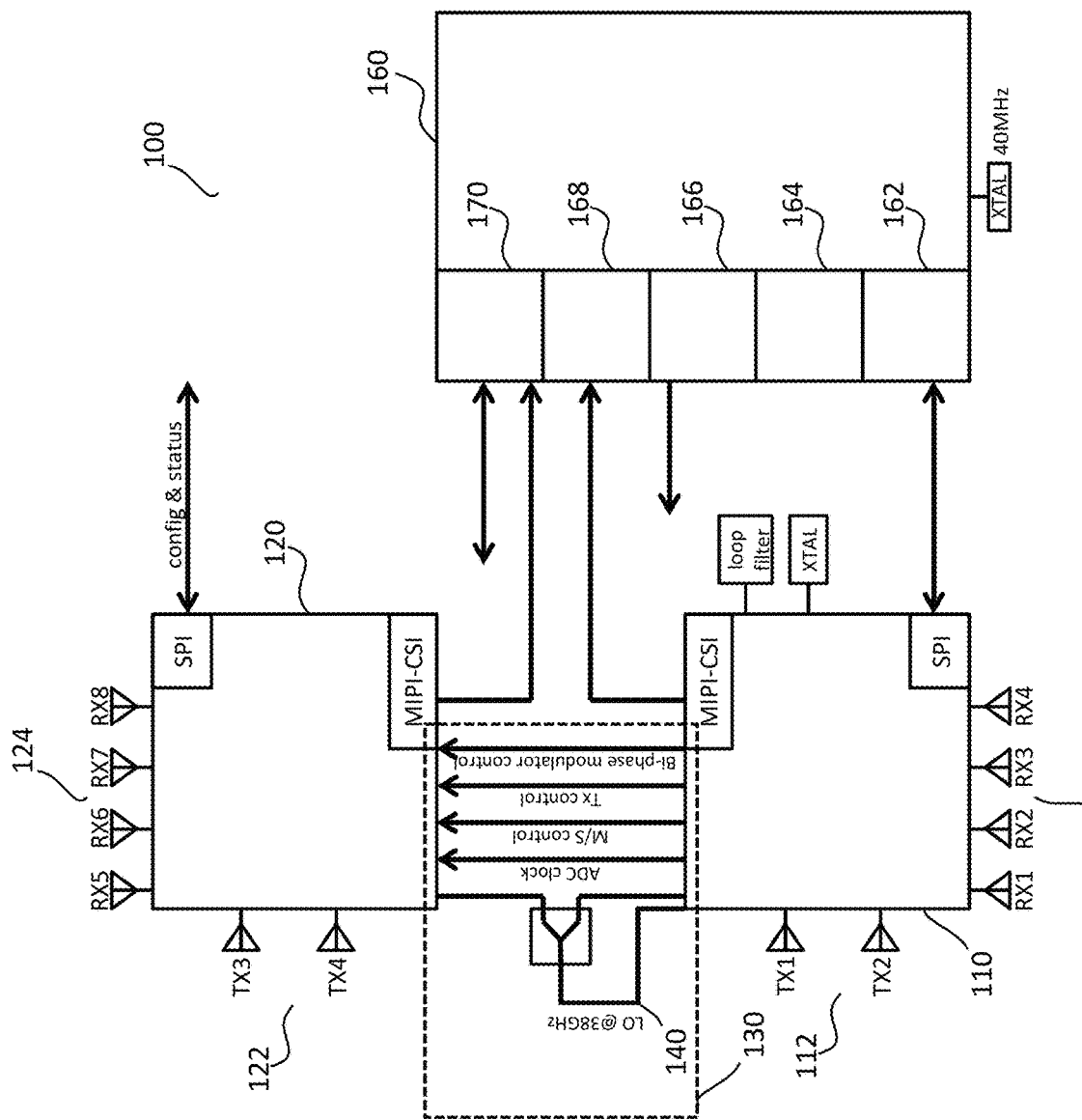
FIG. 1 illustrates a block diagram of a known radar unit that cascades two Radar TRx chips.
Figure 2:
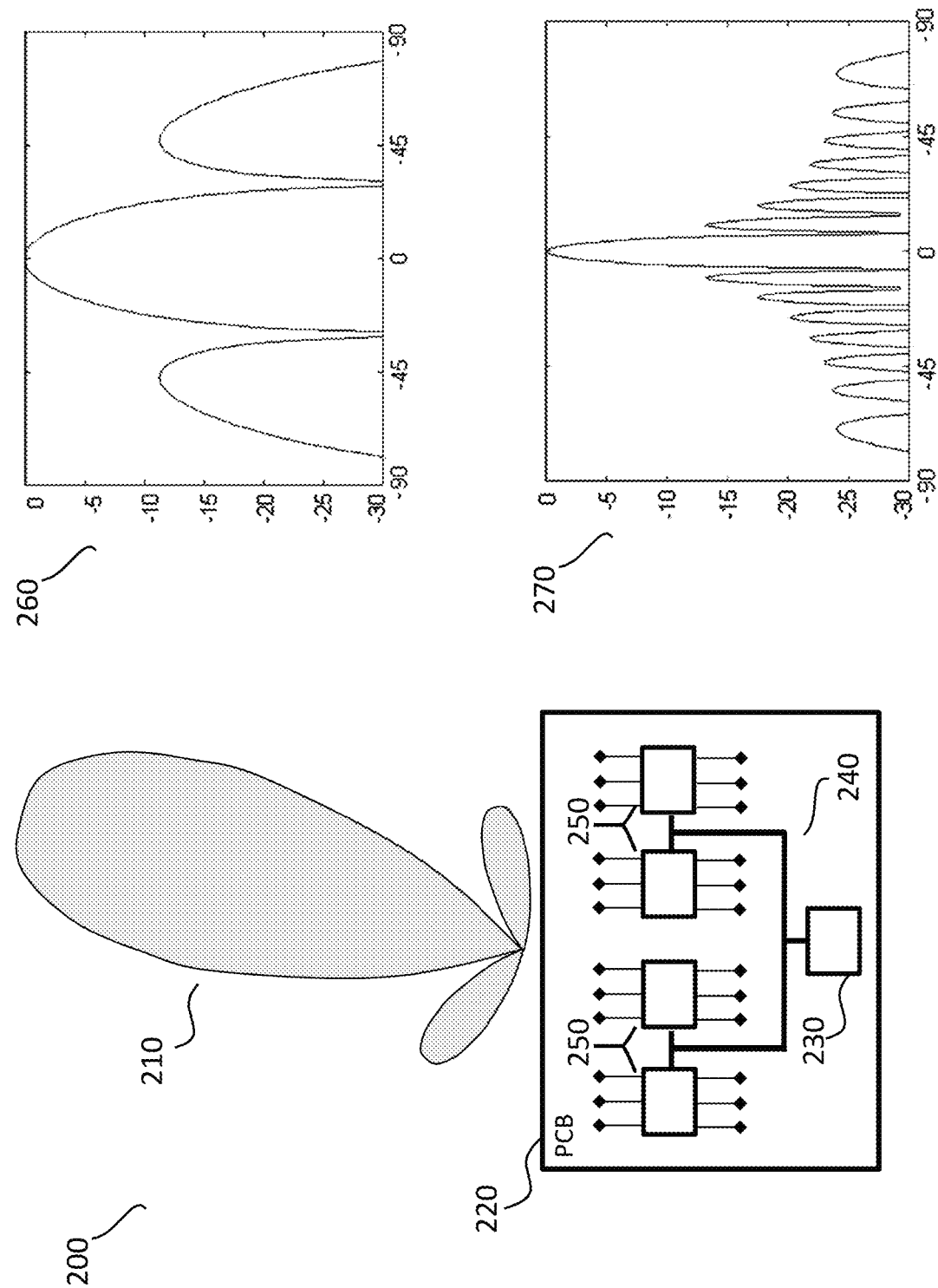
FIG. 2 illustrates an example diagram of a known radar unit that cascades multiple chips with wired interconnection.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Although examples of the invention are described with reference to a use of cascaded integrated circuits for a phased array Radar system with many transceiver circuits not located in a same IC, it is envisaged that the examples herein described may equally be employed in a phased array system for general wireless communication applications and units, such as base stations.

Combining the two techniques (wireless self distance measurement and adapt the system accordingly with the measured distance information) and the method to operate them in the Radar application to the best of my knowledge is novel.

The inventors of the present invention have recognized and appreciated that it would be advantageous to develop a radar unit design with an adaptive distributed phased array radar system, which combines wireless (self) inter-chip localization determination and wireless clock/control signal distribution. In some examples, a new architecture is proposed that facilitates a wireless calibration of the multiple chips employed in a radar unit or radar system that employs a phased array. In some examples, a wireless (self) inter-chip localization determination circuit determines a locality value (or values) (or equivalent, such as distance, delays, etc.) between the multiple chips (referred to as 'self-inter-chip localization').

In one example of the invention, the wireless (self) inter-chip localization determination circuit obtains delay information, which is calculated based on a self-identification of a distance between antennas of multiple chips. In some examples, this determination is made following a wireless calibration of the different path lengths between multiple chips. In this manner, autonomous forming of a larger phased array system using multiple chips/modules may be achieved. This may result in an enabling of a rapid scaling of a transceiver unit number in a phased array radar system by eliminating a need of wired connections for synchronization. Examples of the invention employ wireless synchronization in order to minimize any delay mismatch in either the LO/frequency generation circuitry and/or analog-to-digital converter (ADC) sampling instants (which would ordinarily have led to angle estimation errors) as well as transmit control, frequency chirp start control signals. Examples of the invention employ wireless synchronization in an FMCW radar unit, particularly to align the frequency chirp start and end frequencies. The measured distances between antennas of different chips are used to adapt the phase settings of phase shifters in order to steer the antenna beam with increased accuracy.

Furthermore, examples of the invention allow multiple radar transceiver chips to be located on different PCBs or modules in order to reduce installation complexity in a constructing of an adaptive phased array radar system on a non-planar vehicle surface.

Thus, some examples of the invention propose a method to cascade multiple transceiver chips, for example multiple radar transceiver chips, in order to extend a capability of what can be achieved by a single TRx chip. Each chip may have multiple transceiver circuits associated with their corresponding antennas, where the antennas may be located on-chip or located elsewhere on the PCB. Furthermore, examples of the invention propose a further fine-tuning technique that combines a wireless synchronization technique with an inter phased array unit ranging technique that includes transmitting a signal to an object and waiting for an echo or acknowledgement signal that is sent back by the object(s). The differences between the transmitting and receiving of signals may be processed in order to acquire the distance information in a known manner. Such information is then used to calibrate a delay to be applied to different units across the multiple chips in a wireless distribution of clock signals, in order to control and accurately synchronise transmission and reception of signals (e.g. their frequency and phase).

Figure 3:
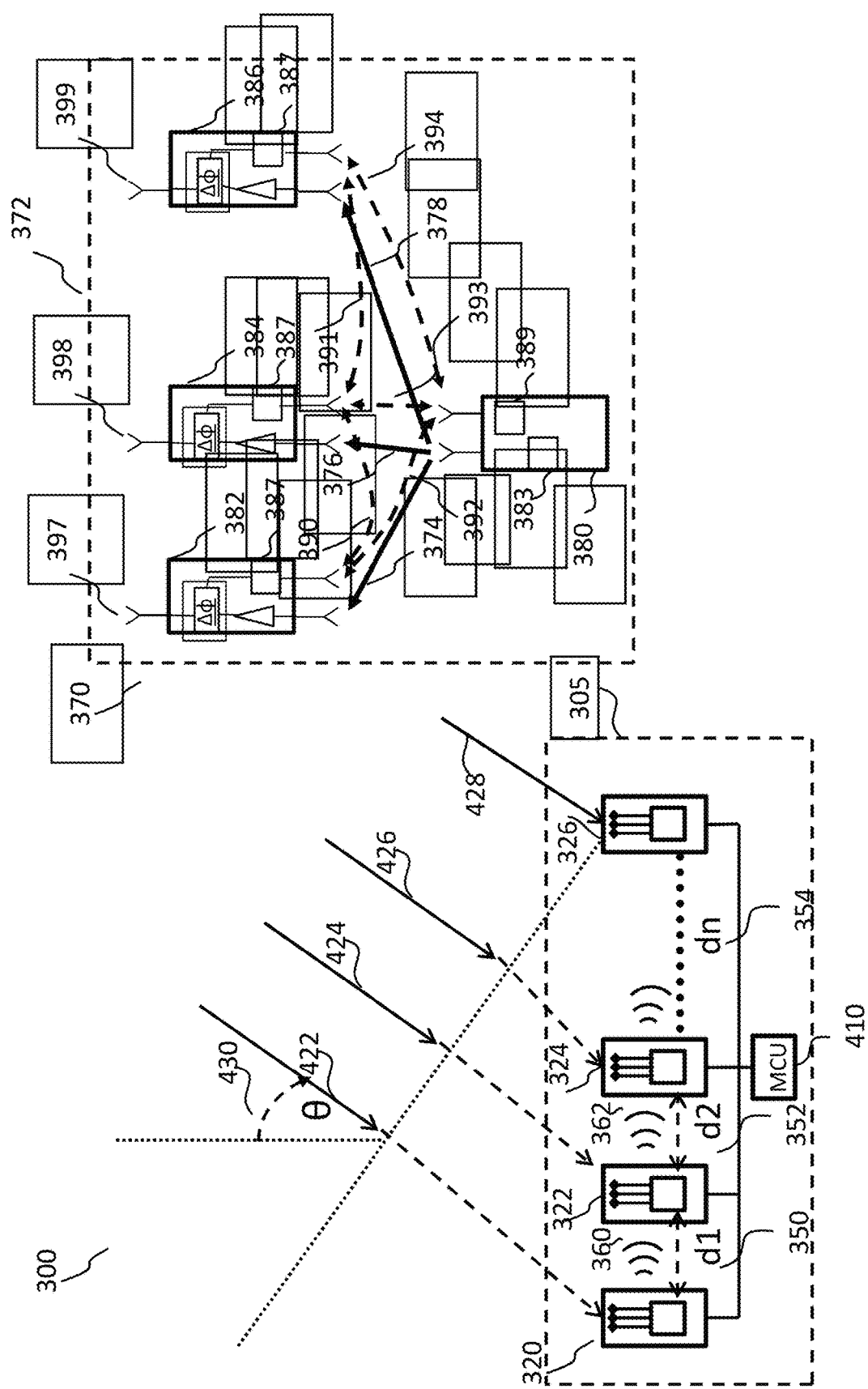
FIG. 3 illustrates two example block diagrams of a phased array system that includes communication units that employ cascading TRx chips enabled as a result of wireless synchronization and distance measurements, according to example embodiments of the invention.

Referring now to FIG. 3, a first example block diagram 300 of a phased array system of a communication unit, such as a radar unit 305 includes cascading chips supporting a larger number of TRx chips, enabled as a result of wireless synchronization and distance measurements. In this example, the radar unit 305 employs multiple chips that use self-inter-chip localisation to synchronise their transmitted signals and calibrate the output phase of each chip, in order to achieve beam steering.

The radar unit 305 includes a plurality of cascading chips 320, 322, 324, 326 located on respective PCBs and configured to form a phased array system. The proposed phased array system is constructed such that a wireless calibration of the cascading chips 320, 322, 324, 326 employed in the radar unit 305 is able to determine a distance between respective antennas between the cascading chips 320, 322, 324, 326, e.g. a first distance (d1) 350 between antennas of a first cascading chip 320 and antennas of a second cascading chip 322, a second distance (d2) 352 between the antennas of the second cascading chip 322 and the antennas of a third cascading chip 324, and so on until a n−1th distance (dn−1) 354 between the n−1th antennas of the n−1th cascading chip and antennas of a nth cascading chip 326. In examples of the invention, the first cascading chip 320 transmits a wireless inter-chip signal 360 to the second cascading chip 322, and the second cascading chip 322 transmits a wireless inter-chip signal 362 to the third cascading chip 324 and so on such that processing of the respective wireless inter-chip signals may be used to determine/measure a distance between chips (e.g. first distance (d1) 350, second distance (d2) 352 etc. . . . ). The respective measurements and calculation of distance can be performed on each chip or at a common central control unit 410 that receives the signal transmission and reception information.

In this manner, the proposed phased array system is able to identify a signal delay to apply to transmitted or received signals, etc., between the multiple cascading chips 320, 322, 324, 326. This wireless calibration is referred to herein as 'self-inter-chip localisation'. The use of this wireless calibration and wireless chip synchronization technique may eliminate a known use of wired connections for synchronizing radar TRx chips (e.g. using cables or PCB traces).

As illustrated in the first example diagram 300, each of the cascading chips 320, 322, 324, 326 is connected to a common central control unit 410 for control and signal processing purposes. In some examples, there may also be bi-direction control/data signals interconnecting between the radar unit and the common central control unit 410 for system initialization and signal monitoring and control purposes, according to example embodiments of the invention.

It is envisaged in one example that the common central control unit 410 may be part of one of the radar units or one of the associated PCB. In this example, the common central control unit 410 may be a processor integrated circuit (IC) that is configured to act as a master unit processor, arranged to measure and record the distance from all the other ICs or antenna units to itself using a wireless ranging technique. This determination is then used by the common central control unit 410 for the purpose of calibration and performance enhancement of the phased array system, for example to improve angle estimation accuracy and detection range. Alternatively, the microprocessor in each radar unit (or PCB or chip) may be configured to measure a distance between the antenna on a respective chip and the next antenna, and thereafter feed this information to a central processing unit to form a map of, say, a radar unit installed in a vehicle.

In a known system, a direction of a target object may be estimated in a beam steering application from a determination of an angle of arrival (θ) 430 of a series of target refection signals. This can be obtained from the known equation [1]:

$$c \cdot \Delta t = d \cdot \sin \theta \quad [1]$$

Where:

c is the speed of the mm-wave;

$\Delta t$ is the difference in time of the refection signals arriving the array units (assuming a plane wave);

d is the distance between array units; More specifically, the distance between antennas.

θ is the angle of arrival;

By solving equation [1], the direction of the target can be estimated using equation [2]:

$$\theta = \sin^{-1}(C \cdot \Delta t / d) \quad [2]$$

In a conventional phased array Radar system, the d is a priori parameter as the antenna of radar TRX units that are placed with predefined spacing. Any deviation of the real/ actual distance value as compared with the predefined spacing will affect the accuracy of the calculation of the angle of arrival.

For completeness, common central control unit 410 may be configured to support beam forming across an N-unit phased array radar system following an accurate determination of the correct delay and phase compensation to be applied, which may be based on a distance measurement between the respective antennas or antenna array units of the N-unit phased array radar system.

In accordance with examples of the invention, the real/actual distance between the antennas in the proposed N-unit phased array radar system may be obtained using a wireless ranging technique with additional built-in hardware, for example as described with reference to the self-inter-chip distance measurement transceiver(s) 570 of FIG. 5. The accurate measurement of the distance value d, may then be used to calibrate/set the phase delay/shift of different TRx units for accurate object location detection and/or steering the direction of the antenna beam (e.g. control its radiation pattern).

In a radar receiver mode of operation, beam steering can be implemented by adding the received signals 422, 424, 426, 428 from an N-unit phased array radar system after correct delay and phase compensation, as calculated by the common central control unit 410. For identical units, the use of a phased array increases the sensitivity by 'N' times, as compared to that of a single unit. In a radar transmitter mode of operation, beam steering can also be implemented by shifting the phase of the transmitting signals of an N-unit phased array radar system. For multiple mid-range radar units, the inputs to an N-unit phased array radar system can be combined in order to increase the radar transmit power, and thereby allow longer range applications.

A second example block diagram 370 of a phased array radar system of a radar unit 372 includes a master radar chip 380 and multiple radar slave chips 382, 384, 386. Each radar slave chip 382, 384, 386 contains at least a radar transceiver, a broadcast receiver and a self-inter-chip localisation transceiver 389. Each radar master chip 380 contains at least a broadcast transmitter 383 and a self-inter-chip localisation transceiver 389. The master radar chip 380 generates the signal modulation and broadcasts a transmit signal via, say, an intermediate-frequency signal to the slave radar chips 382, 384, 386 through the respective broadcast links 374, 376, 378. The broadcast links 374, 376, 378 operate at a fraction of the transmit frequency power in order to avoid interfering with the normal radar operation. In some examples, the radar slave chips 382, 384, 386 may contain frequency multipliers in order to up-convert the broadcast transmit signal to a higher frequency, before the output signal is transmitted by the slave transmit antenna 397, 398, 399, In the second example block diagram 370, the first slave chip 382 transmits a wireless inter-chip signal 390 to the second slave chip 384 and the second cascading chip 384 transmits a wireless inter-chip signal 391 to a third ('N') cascading chip 386 and so on, such that processing of the wireless inter-chip signals may be used to determine/measure a distance between slave chips (e.g. in a similar manner to the distances determined in the first example block diagram 300).

As illustrated, in an alternative example system design, employs one central unit (i.e. master unit 380) configured to generate the LO signal and distribute the LO signal and various control signals, such as wireless inter-chip signals 392, 393, 394, to slave units 382, 384, 386. The advantage in this example is that the slave units 382, 384, 386 may have less complex hardware and act as repeaters, but with correct power and phase control. In this example, the respective measurements and calculation of distance may be performed on each slave chip 382, 384, 386 and relayed to the master unit 380 or the distances calculated at the master unit 380 in response to receiving the signal transmission and reception times of the wireless inter-chip signals from the slave chips 382, 384, 386.

In this manner, the proposed phased array system is able to identify a signal delay to apply to transmitted or received signals, etc., between the multiple slave chips 382, 384, 386, as well as from the master chip 380 and each respective slave chip 382, 384, 386 in a form of 'self-inter-chip localisation'. The use of this wireless calibration (or wireless synchronization) may eliminate a known use of wired connections for synchronizing radar TRx chips (e.g. using cables or PCB traces).

In some examples, the proposed phased array system with a wireless calibration of a distance between the cascading chips allows the phased array system to include a larger number of transceiver (TRx) chips than can currently be supported per radar unit with a similar profile (e.g. size).

Figure 4:
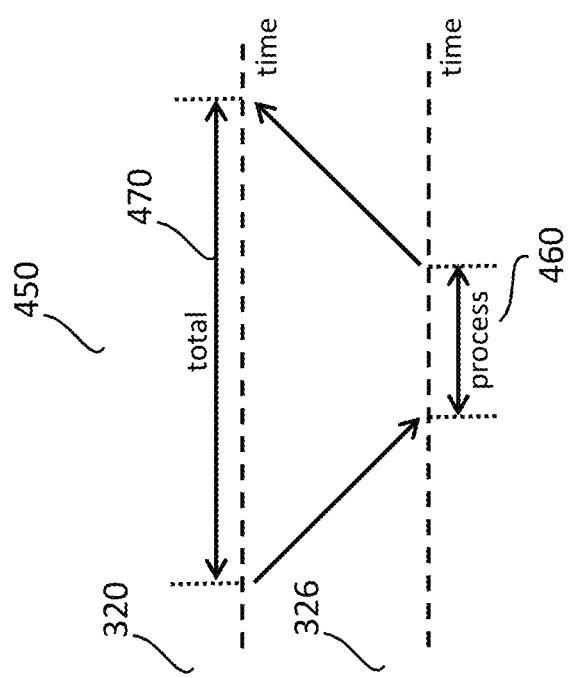
FIG. 4 illustrates an example time-of-flight measurement that can be used to measure the distance between multiple radar chips.

In some examples, the self-distance measurement between radar chips may be based on a determined round trip time of flight measurement, which provides distance information between respective array units. In some examples, the distance information between respective array units may be used in angle of arrival estimation calculations (as illustrated in FIG. 4). In some examples, the distance information between respective array units may be used in beam steering calculations, for example to manipulate a beam pattern.

In some examples, it is envisaged that the beam steering calculations may be employed in a steering phased array antenna main beam, in order to locate a direction of incoming signal and gain spatial information of the interferers. In this example, it is envisaged that the radar unit may perform electronical steering of the antenna beam to cover a wide range of directions. An MCU of the radar unit may re-configure, using for example control signal from MCU 410 or master unit 380 in FIG. 3, a phased array detection path in order to scan different frequencies and/or adjust phased array circuits. For example, the phased array circuits may be composed of multiple, adjustable, parallel and/or selectable delays (not shown), in order to create stronger transmitter and/or receiver active beams, and in some examples create beam 'nulls' for example in a direction of an identified interferer. In this manner, using a phased array transmitter, the MCU 410 or master unit 380 of the radar unit may adjust the delay/phase difference amongst different paths, and thus the direction of the transmitting signal beam can be adjusted. Similarly, the MCU 410 or master unit 380 of the radar unit may adjust the delay/phase difference amongst different paths, and thus the direction of the receiving signal beam can be adjusted by a phased array receiver. The strength of the beam indicates the gain of the antenna.

In this manner, the phased array system of example embodiments of the invention is able to benefit from improved accuracy as a result of wireless synchronization and control of transmitted and received signals and distance measurements between antennas in a multiple TRx chip configuration.

Although examples of the invention are described with reference to cascading chips to form a phased array system with radar TRx chips located on separate PCBs, it is envisaged that some examples may employ the cascading chips to form a phased array system with radar TRx chips located on one common PCB.

In some examples, it is envisaged that a wireless synchronization of control signals and inter-chip ranging (e.g. distance determination) technique may share the same hardware but use a different signal frequency from the normal radar signal, thereby allowing the technique to operate in the background of normal radar communications and not interfere therewith. The use of a wireless synchronization of control signals may avoid a need to include complicated LO distribution circuitry and traces on the PCB and allow a reduction in the number of RF substrate layers required, as only a single RF substrate is needed for TRx antenna array. This approach allows also cascading of radar TRx chips on different PCBs or modules without a need of cable interconnection, which also leads to a cost reduction.

In some examples, the use of a wireless synchronization of control signals together with an inter-chip ranging (e.g. distance determination) technique, may enable a rapid scaling of the number of radar TRx units in a multiple-in multiple-out (MIMO) or phased array radar system and avoid the burden of re-designing a PCB every time the number of TRx units is to be increased. In some examples, this combination of features may also enable a construction of an adaptive phased array radar system, for example on a non-planar vehicle surface. In some examples, the adaptive phased array radar system may include uniform linear arrays, uniform rectangular arrays, uniform circular arrays, or even conformal arrays.

FIG. 4 illustrates one example of a mechanism to calculate a distance measurement between antennas of radar units 320 and 326, otherwise referred to herein as wireless localization using a roundtrip time of flight (ToF) measurement method 450. In this ToF measurement method 450 example, in order to extract the parameter d based on roundtrip ToF, the $T_{total}$ time 470 is a measured parameter and a $T_{process}$ 460 is a known parameter. This ToF calculation uses the equation [3]

$$d = \frac{c \cdot (T_{total} - T_{process})}{2} \quad [3]$$

Figure 5:
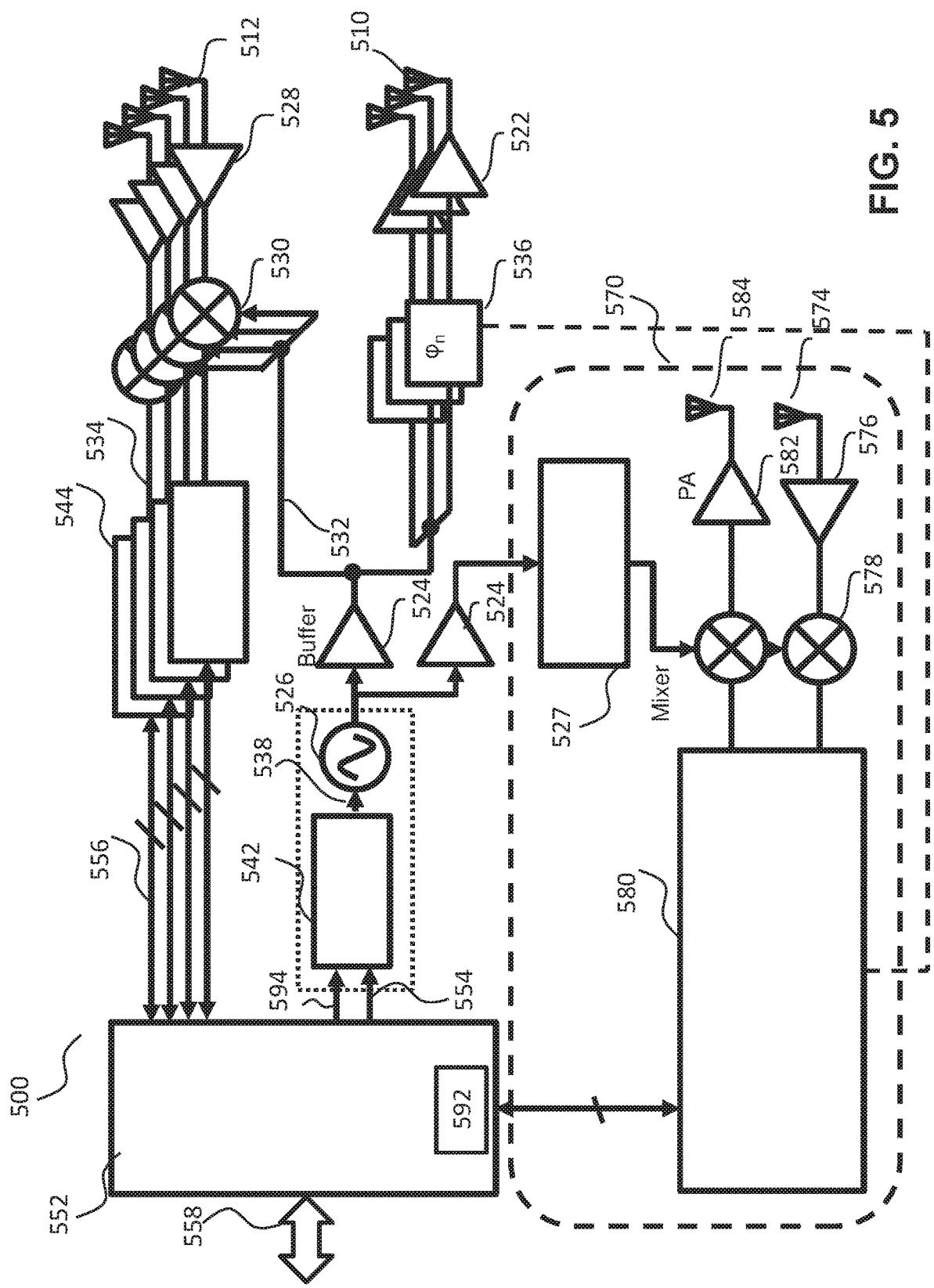
FIG. 5 illustrates a third example block diagram of a radar unit for use in a phased array radar system, according to example embodiments of the invention.

Referring now to FIG. 5, a third example block diagram of a communication unit, in a form of a radar unit 500 configured for use in a phased array radar system is illustrated, according to example embodiments of the invention. In this example, the radar unit 500 is composed of arrays of transmitters and receivers configured to operate in a frequency modulated continuous wave (FMCW) mode of operation, whereas in other examples (not shown) the radar unit may be composed of a single or a wideband transceiver and/or be configured to operate with other radar modes of operation. Other radar modes of operation may include, for example, pulse mode continuous wave (PMCW), frequency shift keyed (FSK), ultra-wideband (UWB) impulse radar, Pulse Doppler radar. The use of transceiver arrays enables the number of transmitter and receiver channels that can be supported by the radar unit 500 architecture to be scalable.

In a transmitter mode of operation, a microprocessor unit (which may be located in a dedicated processor integrated circuit (IC)) 552 is configured to perform digital control and signal processing that provides a first transmit radar signal 554 to a local oscillator and frequency generation circuit that includes a waveform generator 542 in, say, an analog/mixed signal baseband circuit. The waveform generator 542 provides a signal 538 that is to be modulated by a voltage controlled oscillator circuit 526. The modulated signal is then optionally passed to a buffer 524 or frequency multiplier in the main radar transmit path (if the voltage controlled oscillator (VCO) generated signal is not at the operating frequency of the FMCW radar unit 500). The high-frequency output 532 of the buffer 524 or frequency multiplier is passed to a power amplifier 522 via a phase shifter circuit 536 (such as the phase shifter circuit illustrated and described with reference to FIG. 6), where it is amplified and routed to the one or more transmitter antenna (e) 510.

In examples of the invention, the localization processing circuit 570 is configured to adjust at least one phase shifter, e.g. one or more of phase shifters 536 in a transmitter sense, or one or more phase shifters 592 in a digital domain in a receiver sense, e.g. to perform digital beamforming, in response to the wirelessly determined distance relationship, a phase control unit (602), operably coupled to the localization processing circuit (570) and configured to adjust at least one phase shifter (616) in response to the wirelessly determined distance relationship In a receiver mode of operation, a first received radar signal may be received at the one or more receiver antenna(s) 512 and passed to a low noise amplifier (LNA) 528 where it is amplified. The amplified received radar signal is passed to a down-mixer 530, where it is mixed with the high-frequency signal 532 output from the VCO 526. The down-converted received radar signal 534 from down-mixer 530 is input to a programmable baseband circuit 544. The programmable base-band circuit 544 implements one or more programmable bandpass filter(s) and one or more gain amplifiers, as well as a highly linear ADC that processes a relative narrow band signal, for example in a range between a few kHz up to tenths of MHz. The programmable baseband circuit 544 outputs a narrowband, high linearity digitized signal 556 to the digital control and signal processing unit 552 for processing and the received processed radar signal 558 is output. In some examples, the control signals 594, which are much lower frequency signals (tenths of MHz or lower) compared to the LO signal (of tenths of GHz) may be used to modulate the amplitude of the transmitted LO signal. Thus, in some examples it is envisaged that control signals 594, such as measurement and control, data and clock signals, calibration, configuration and status control signals, etc., distributed by signal processing unit 552 may be synchronized and/or distributed wirelessly as information modulated onto the LO signal, as these control signals 594 are at relatively low frequency.

In accordance with this example of the invention, the radar unit 500 has been configured to include one or more additional self inter-chip distance measurement transceiver(s) 570 that facilitate self inter-chip distance measurement. The one or more additional transceiver(s) 570 includes at least one power amplifier 582 configured to amplify a signal for use in a self inter-chip distance measurement that is routed to one or more additional transmitter antenna(s) 584. The one or more additional transceiver(s) 570 also includes one or more additional receiver antenna(s) 574, LNA 576, down-mixer 578 and localization processing circuit 580 that is detection receiver(s) configured to perform a synchronization of received signals and encoding and decoding operations for wireless inter-chip/antenna distance measurements. In some examples, the localization processing circuit 580 may also be configured to generate a number of TRx control signals 594.

In accordance with examples of the invention, the output signal from LO 526 is also routed to a clock divider and/or frequency multiplier circuit 527 for down-mixing the wireless synchronization received signals and for the divided down clock signals to be used by the self inter-chip distance measurement transceiver(s) 570 in synchronizing the LO signals among different radar units, as well as encoding and decoding operations.

A skilled artisan will appreciate that the construction of self inter-chip distance measurement transceiver(s) 570 may vary slightly in design, but not intent or application, in an example implementation that uses a laser technology. In some examples, it is envisaged that a laser technology (such as Lidar) for the self inter-chip distance measurement transceiver(s) 570 may be employed in combination with the radar unit 500 of FIG. 5 to produce a large adaptive phased array system.

Although FIG. 5 illustrates a single additional self inter-chip distance measurement transceiver(s) 570, it is envisaged that multiple additional self inter-chip distance measurement transceivers 570 may be used, in a similar manner to the multiple main radar transmitter and receiver paths. Furthermore, although the illustrated self inter-chip distance measurement and LO/control signal 594 distribution are based on continuous wave techniques such as FMCW, it is envisaged that the concepts herein described are equally applicable to a pseudo noise (PN)-code modulated CW principle or pulsed architectures, such as ultra wideband (UWB) impulse radio or indeed with laser technology.

In operation, at a system start-up or during normal radar operation in the background (in a case where the operational frequency of the one or more additional self inter-chip distance measurement transceiver(s) 570 differs from the main radar operational frequency), the one or more additional self inter-chip distance measurement transceiver(s) 570 in each radar IC is configured to transmit a detection signal to other ICs in order to determine a distance measurement between the antennas of respective ICs based on, say, a ToF technique as described with reference to FIG. 4.

In this example, it is envisaged that the detection receiver(s) may be located remotely from the dedicated processor IC 552, however in other examples it is envisaged that the detection receiver(s) may be incorporated into dedicated processor IC 552. In some examples, the dedicated processor IC 552 (or processor IC 580) may be configured to extract or determine the one or more delays, and/or calculate the respective distance information between antennas under measurement.

In some examples, it is envisaged that clock divider and/or frequency multiplier circuit 527 may incorporate any high frequency clock distribution topology, such as that described in X. Guo, D.-J. Yang, R. Li, and K. K. O, "A Receiver with Start-up Initialization and Programmable Delays for Wireless Clock Distribution," and published in 2006 *IEEE International Solid State Circuits Conference—Digest of Technical Papers,* 2006, pp. 1530-1539. Examples of the invention can readily use a variation of the 18 GHz clock receiver described in this paper with a technique to avoid the problem of start up with random phases. A monotone sine wave may be used for clock distribution to reduce the complexity.

Figure 6:
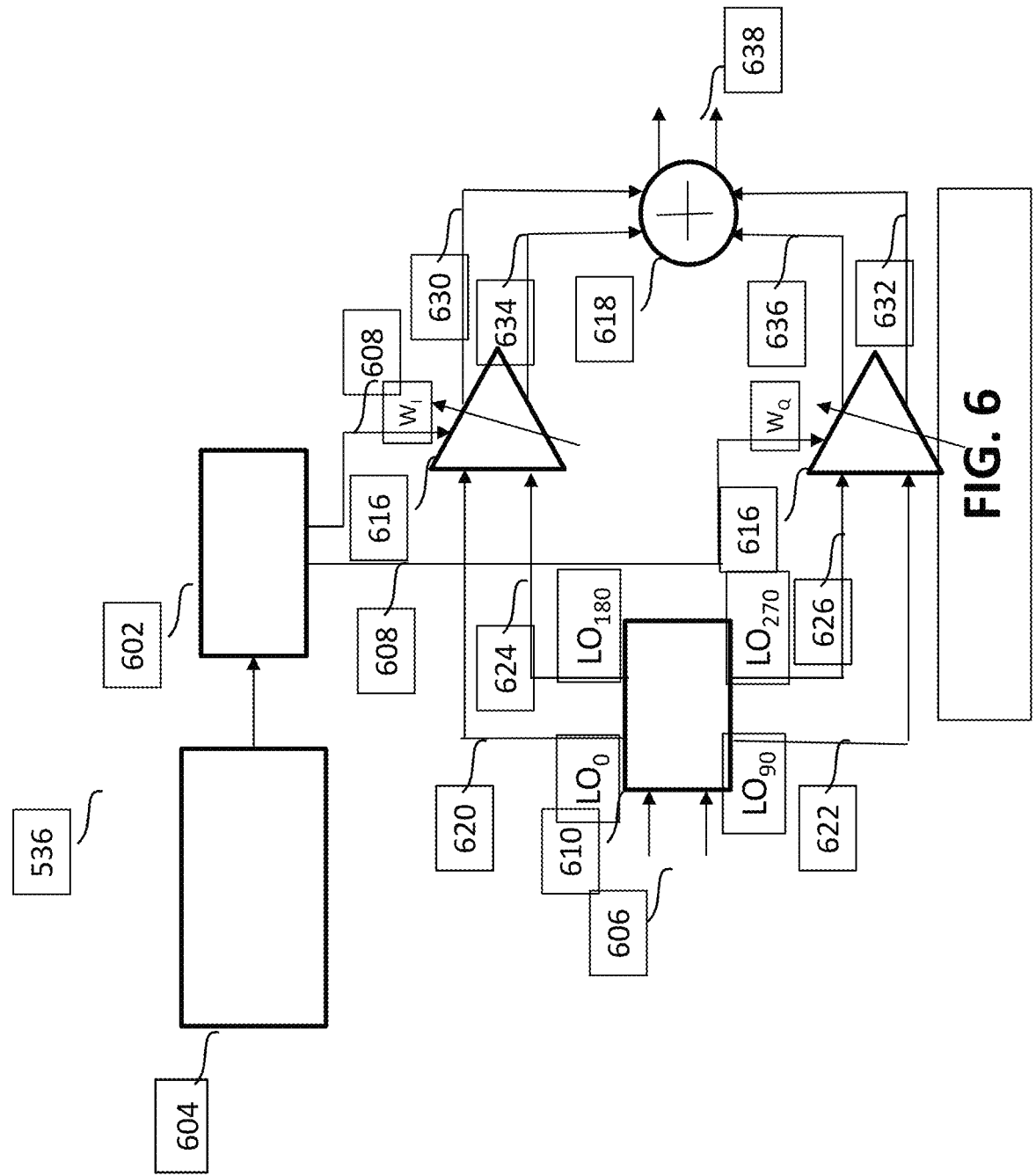
FIG. 6 illustrates an example of a phase shifter implementation in a transmitter for beamforming, according to example embodiments of the invention.

Referring now to FIG. 6, an example of a phase shifter 536 implementation in a transmitter for beamforming is illustrated, according to example embodiments of the invention. In the example phase shifter 536, an input local oscillator (LO) signal 606 is fed to a quadrature (I/Q) signal generator 610, which outputs quadrature signals 620, 622, 624, 626 (i.e. quadrature shifted components of the input signal 606) of 90 deg. separation. The quadrature signals 620, 622, 624, 626 are input to respective variable analog phase shifters 616, controlled by phase control unit 602 via control paths 608. In this manner, the phase control unit 602 is able to respectively adjust the phase of any of the quadrature signals 620, 622, 624, 626, to produce output (potentially phase shifted) quadrature signals 630, 632, 634, 636. The output (potentially phase shifted) quadrature signals 630, 632, 634, 636 are combined in summing junction 618 that produces an output signal 638. In this manner, substantially 90 degrees phase shifted LO signals are summed with respective phase-shifting effectively applied.

An inter array distance measurement circuit 604 is connected to the phase control unit 602 to implement the calculated required phase shift ($\varphi$) for configuring the variable analog phase shifters 616 in the phased array system. Alternatively, in some examples, the inter array distance measurement circuit 604 may assist a calibrating of a set of predefined values, in order to enhance system performance in terms of angular accuracy, for example, especially for a non-uniform phased array. In this manner, the distance measurement information obtained by the inter array distance measurement circuit 604 is used to control the phase shifters (e.g. the amount of phase difference between the signals passing there through) of the transmitters in a multi-chip phased array system.

In some examples of the invention, it is envisaged that the aforementioned examples may be suited for lower power applications as the above examples eliminate the need for an additional power hungry LO buffer in order to drive long transmission lines off-chip on a PCB. In some examples, the radar system may benefit from increased flexibility with the opportunity to introduce a larger antenna array around the vehicle, e.g. with a 360 degree view. The use of a wireless communication link removes a need for installing expensive and potentially heavy cables. In addition, examples of the invention readily enable an extension of the radar system to include multiple ICs in the same or separated PCBs or packages.

The wireless synchronization may also be used to transmit data and/or control signals, where the control signals are required to setup the co-operation of the units in the phased array system, so that many more radar ICs can be calibrated and used.

Figure 7:
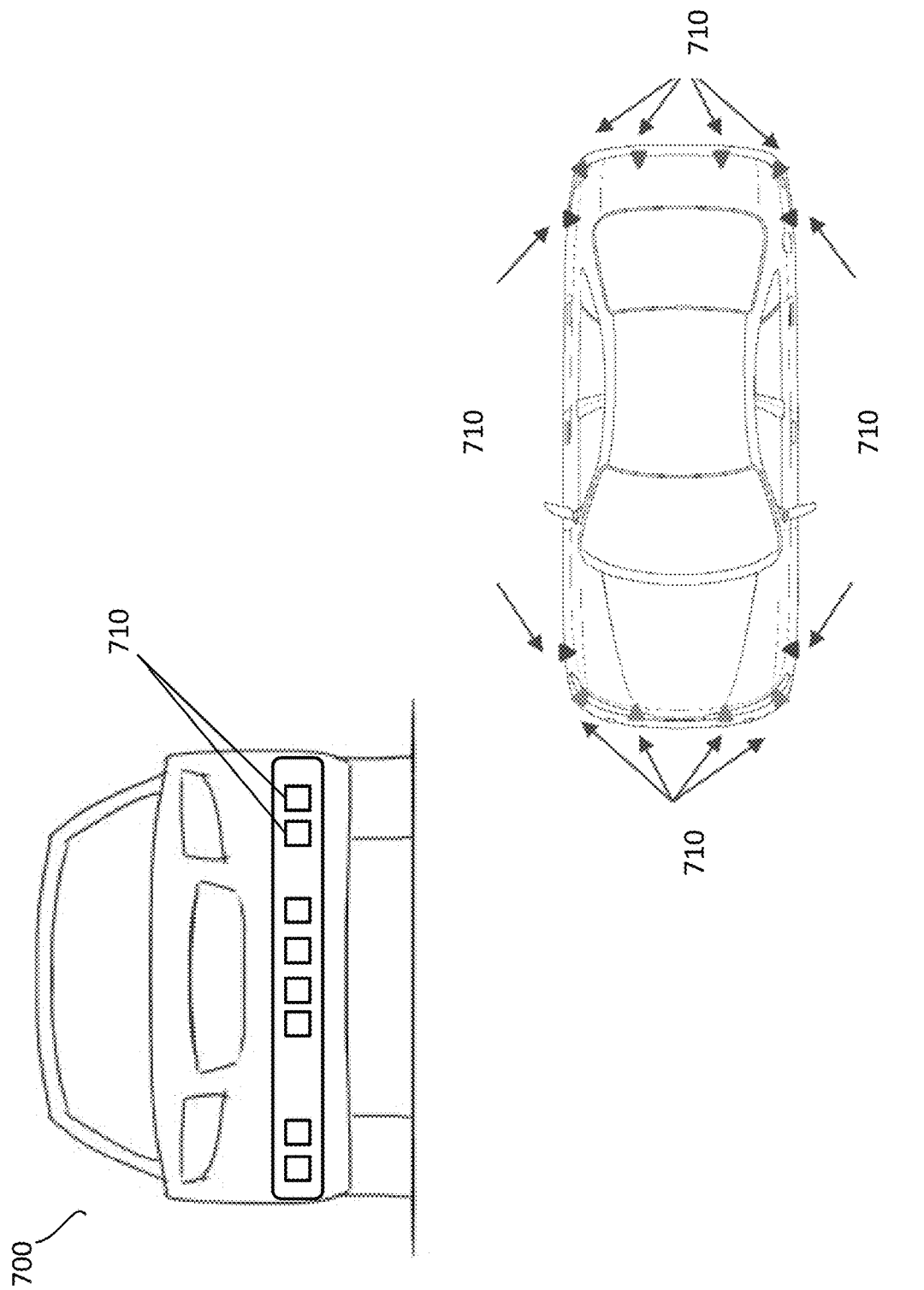
FIG. 7 illustrates an example of a vehicle with a range of radar unit sensors, according to example embodiments of the invention.

In one example operation, it is envisaged that the radar units that include a built-in inter-chip localization feature may be employed in radar units in vehicles, for example in the radar sensors 710 in the vehicle 700 of FIG. 7. Examples of the invention may be additionally employed to support beam steering control in a phased array radar system across multiple sensors, in some examples having multiple chips.

Examples of the invention propose a method for cascading a plurality of mmW TRx circuits in a radar unit each comprising at least one phase shift circuit and each coupled to respective antennas. The method comprises: processing transmit and receive signals of the plurality of cascaded mmW TRx circuits, wirelessly transmitting a signal from a first TRx circuit of the plurality of cascaded mmW TRx circuits to a second TRx circuit via a respective antenna, determining a distance relationship between at least one antenna coupled to the first TRx circuit and at least one antenna coupled to the second TRx circuit by a localization processing circuit operably coupled to at least one of the first TRx circuit and second TRx circuit: and adjusting at least one phase shifter by a phase control unit, operably coupled to the localization processing circuit (570), in response to the wirelessly determined distance relationship.

Figure 8:
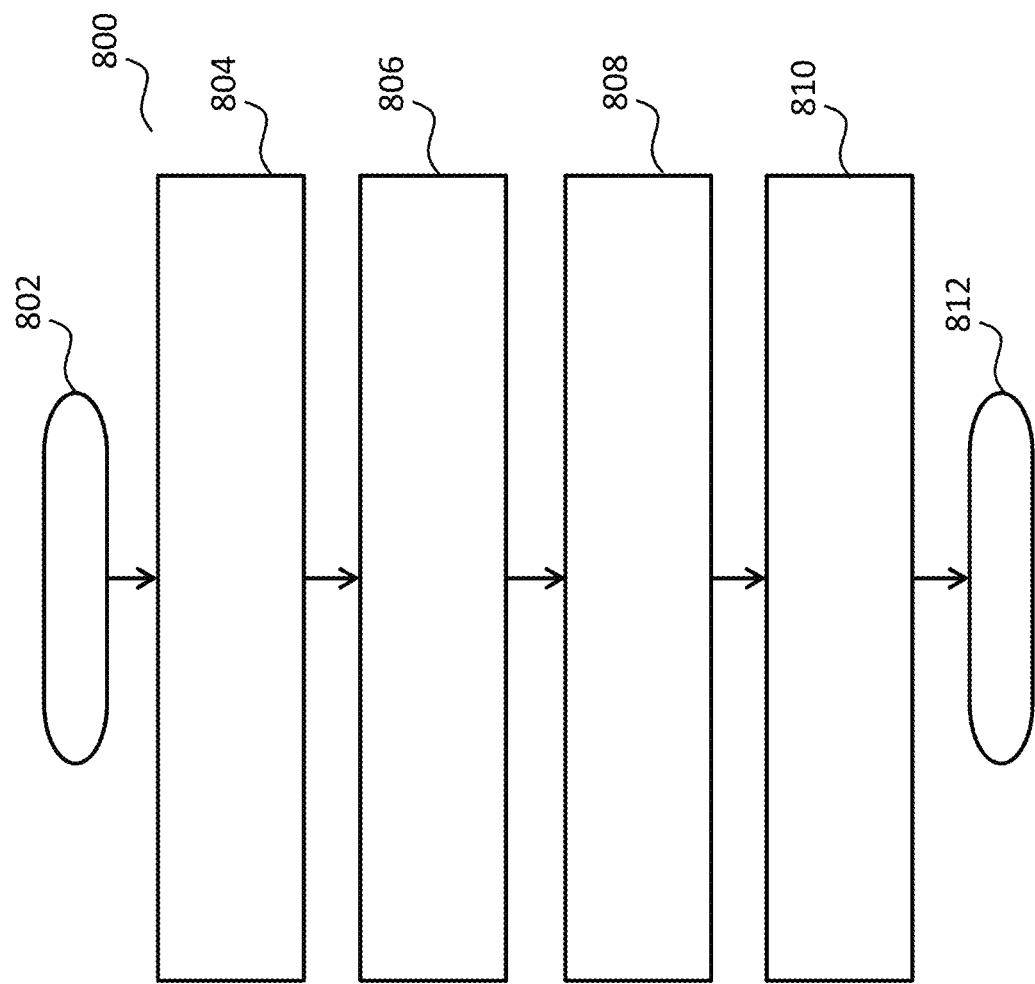
FIG. 8 illustrates a first example flowchart of the steps associated with synchronizing a local oscillator clock, according to example embodiments of the invention.

Referring now to FIG. 8, a first example flowchart 800 of the steps associated with synchronizing a local oscillator signal/clock is illustrated, according to example embodiments of the invention. The flowchart starts at 802. In one example application, firstly, a waveform generator of a master unit controls its VCO to output a LO signal with a fixed frequency that is proportional to a chirp start frequency, $f_{start\_master}$, at 804. At 806, slave units are initiated to receive the signal from the master unit, and accordingly adjust their LO frequency to be the same as that in the master unit. In some examples, the slave units record the control bits. In some examples, this signal may be processed by the 'clock divider or multiplier' circuit 527 shown in FIG. 5 and sent out by the transmitter to other chips/antenna of the radar unit.

Secondly, in some examples, the slave units may also be configured with the same setting (the digital control bits in order to set the LO signal frequency) to output a LO signal with frequency $f_{state\_slaveN}$. This signal may be processed and sent out by the transmitter to other chips/antenna of the radar unit. It is used to down-convert the received signal from the master unit, which has frequency $f_{start\_master}$. These two signals' frequencies are compared. If $f_{start\_slaveN} = f_{start\_master}$, that mean the frequency of the master unit and slave units are synchronized. If not, a down-mixer will output a signal with frequency equal the difference of $f_{start\_slaveN}$ and $f_{start\_master}$. The LO frequency of the slave unit(s) will then be adjusted by the digital control bits until they are the same as that in the master unit, in 810. The digital control bits of the 'LO and frequency chip generation circuits', for generating the chirp start frequency will be updated. In this manner, the same procedure for the synchronization of the $f_{end\_slaveN}$ and $f_{end\_master}$ is employed, after which, all the slave units will have the same frequency chirp start and end frequencies. The flowchart ends at 812

Figure 9:
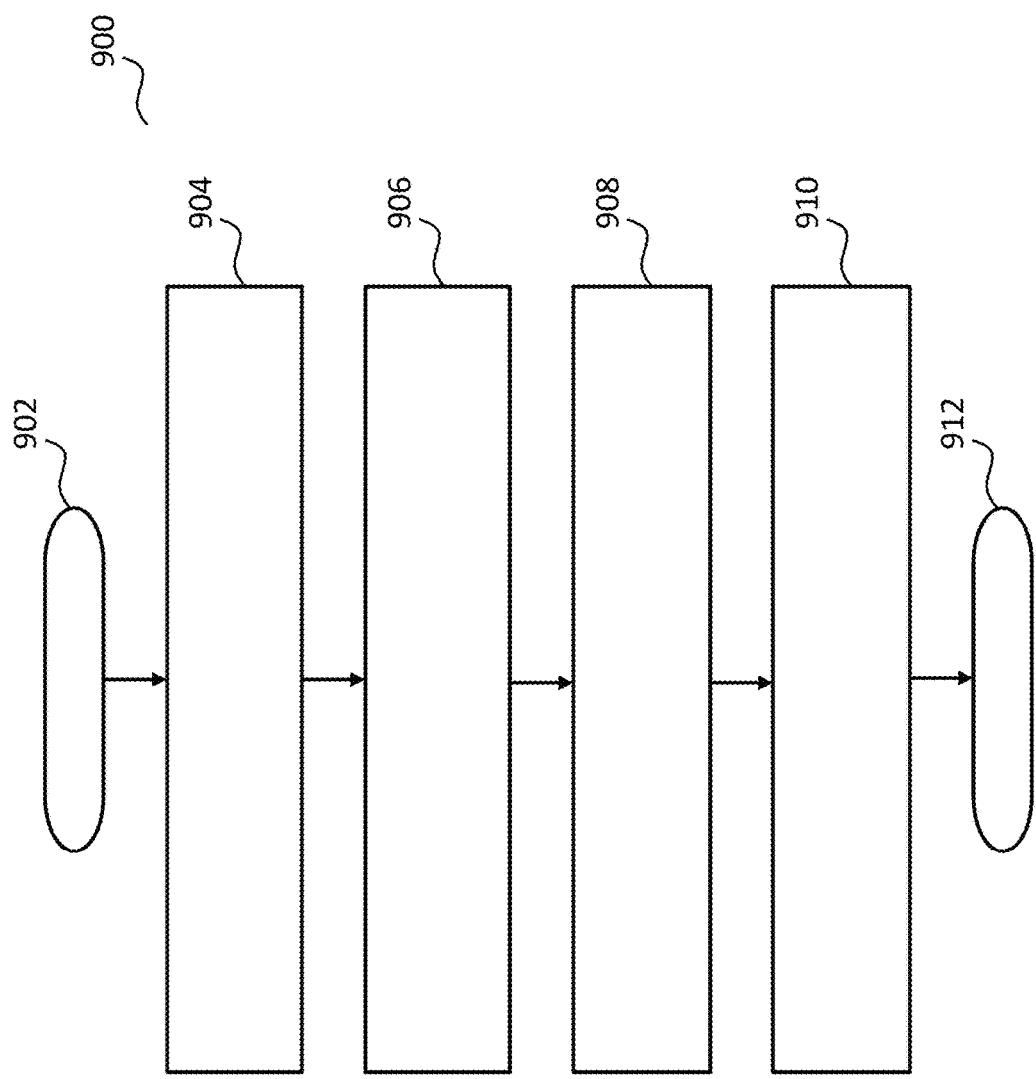
FIG. 9 illustrates a second example flowchart according to the first example block diagram of a phased array radar system of FIG. 3.

Referring now to FIG. 9, a second example flowchart 900 according to the first example block diagram of a phased array radar system of FIG. 3, is illustrated according to example embodiments of the invention. The second example flowchart 900 starts at 902 and moves to 904 where the N-unit phased array radar system is initialized, and a central control unit (e.g. microcontroller unit (MCU) 410 of FIG. 3) communicates to respective radar transceiver units to start a synchronization phase. At 906, each chip of the radar unit automatically synchronizes their LO and analog-to-digital converter (ADC) clock and other control signals, and measures the distance to one or more of its neighbouring chips/antennas, for example in accordance with one of the techniques described in FIG. 4, or using in other examples, say, laser sensors to achieve a higher accuracy distance measurement. In examples, of the invention, laser technology is also considered as a wireless technology (where light has a much higher frequency with a wavelength of a few hundred nm). The benefit of using a laser for short distance measurements is that the measurement accuracy is much higher. Hence, it is envisaged that laser technology using the architecture in FIG. 3, will be particularly useful in the future for high-end applications.

At 908, and based on the determined inter-chip antenna distance information, the multi chips phased array system is configured or calibrated to have the desired phase delay/phase shift settings. At 910, the synchronization process ends and the normal radar detection phase starts, with all radar transceiver units working together as one phased array system. The flowchart then ends at 912.

Figure 10:
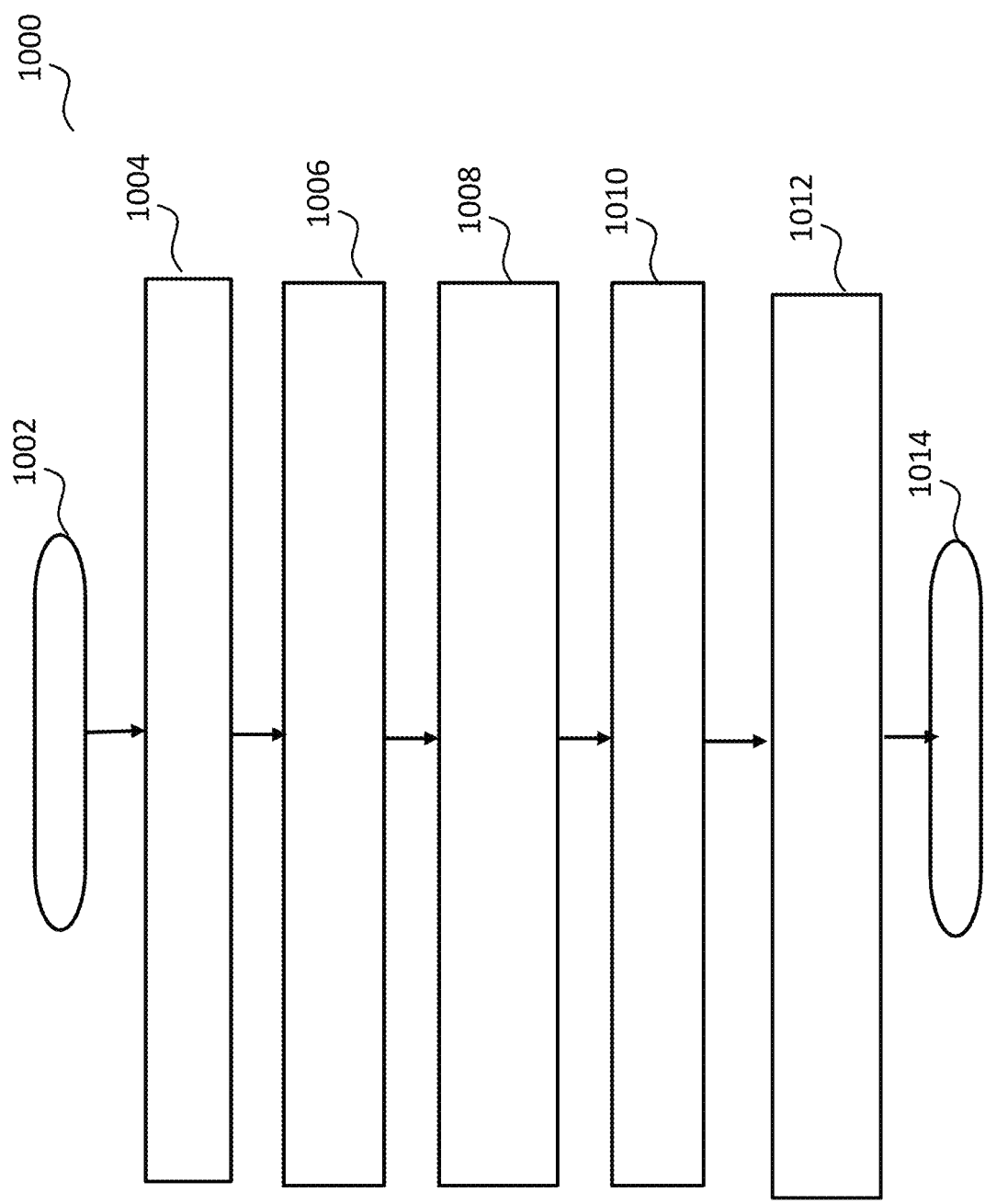
FIG. 10 illustrates a third example flowchart according to the second example block diagram of a phased array radar system of FIG. 3.

Referring now to FIG. 10, a third example flowchart 1000 according to the second example block diagram of a phased array radar system of FIG. 3, is illustrated according to example embodiments of the invention. The third example flowchart 1000 starts at 1002 and moves to 1004, where the master radar unit measures the distance to the slave radar units. Next, at 1006, each slave radar unit measures the distance to its nearby slave radar unit(s) using an auxiliary wireless link, as described earlier in the example of FIG. 5. At 1008, based on the determined inter-chip antenna distance information, the multi chips phased array system is configured or calibrated to have the desired phase delay/phase shift settings. At 1010, the master radar unit transmits the radar signal to the slave radar units at an intermediate frequency. At 1012, the slave radar units upconvert the signal coming from the master radar unit and transmit the upconverted signal with the desired phase shift. The flowchart then ends at 1014.

Thus, examples of the invention describe a radar system that includes an enhanced target detection and direction finding mechanism, with a deterministic initial phase shift value being used. In this manner, improved flexibility in, say, a beam steering application can be achieved by supporting many more ICs than in current systems, through use of wireless distribution of control signals and associated calibration of distances between the ICs.

It is envisaged, in some examples, that the architecture herein described may be used, say as a FMCW where more output power is concentrated in one frequency, so it has a better range performance. The architecture herein described may be used, say, as a PMCW radar when the prevailing operational condition(s) is/are less susceptible to interference, but where there is a lower peak power and a demand for more computational power.

The architecture herein described may be used, say, as a UWB impulse radar, when a good range resolution is desired and where it may be easy to adapt the range resolution by adjusting a radar pulse width. Similarly, the architecture herein described may be used, say, as a UWB impulse radar when it also has a low power consumption and may be needed to provide a wide coverage in azimuth angle but only provide range information, such as for a parking or stop and go sensor.

Although examples of the invention are described with reference to a radar unit for an automotive safety system, it is envisaged that the concepts herein described may be applicable to other applications, such as radar for robotics or drones.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A communication unit comprising:
    a plurality of cascaded millimetre wave, mmW, transceiver, TRx, circuits, each comprising at least one phase shift circuit and each coupled to respective antennas; and
    a signal processor circuit operably coupled to the plurality of cascaded mmW TRx circuits and configured to process transmit and receive signals of the plurality of cascaded mmW TRx circuits;
    a first TRx circuit of the plurality of cascaded mmW TRx circuits being configured to wirelessly transmit a signal to a second TRx circuit via a respective antenna;
    a localization processing circuit operably coupled to at least one of the first TRx circuit and second TRx circuit and configured to determine a distance relationship between at least one antenna coupled to the first TRx circuit and at least one antenna coupled to the second TRx circuit; and
    a phase control unit, operably coupled to the localization processing circuit and configured to adjust the at least one phase shifter in response to the distance relationship;
    wherein the signal processor circuit is operably coupled to a frequency generation circuit configured to generate a local oscillator, LO, signal for use by the cascaded mmW TRx circuits in the communication unit and the signal processor circuit is configured to distribute control signals within the communication unit by modulating an amplitude of the LO signal.

2. The communication unit of claim 1 wherein the distance relationship comprises one or more of: a geographical distance between a number of the plurality of mmW TRx antennas, a transmission delay between at least a number of the plurality of mmW TRx circuits.

3. The communication unit of claim 1 wherein the communication unit is radar unit employing a phased array radar system across multiple integrated circuits, ICs.

4. The communication unit of claim 3 wherein the plurality of cascaded mmW TRx circuits is configured to support a normal radar mode of operation that comprises transmitting a radar signal waveform and receiving an echo signal thereof and an auxiliary mmW TRx circuit is operably coupled to the signal processor circuit and comprises the at least first TRx circuit and second TRx circuit.

5. The communication unit of claim 4 wherein the plurality of cascaded mmW TRx circuits comprises at least the first TRx circuit and the second TRx circuit.

6. The communication unit of claim 1 wherein the the plurality of cascaded mmW TRx circuits comprises at least the first TRx circuit and the second TRx circuit.

7. The communication unit of claim 4 wherein the auxiliary mmW TRx circuit includes a master transceiver circuit configured to generate a signal modulation and broadcast a transmit signal via an intermediate-frequency signal to the plurality of cascaded mmW TRx circuits at a fraction of the transmit frequency power in order to avoid interfering with the normal operation mode.

8. The communication unit of claim 3 wherein the communication unit is a frequency modulated continuous wave, FMCW, radar unit and the phase control unit is configured to align frequency chirp start and end frequencies of the FMCW radar unit when adjusting the at least one phase shifter.

9. The communication unit of claim 1 wherein the respective antennas coupled to the plurality of cascaded mmW TRx circuits are configured to operate as a phased antenna array.

10. The communication unit of claim 9 wherein the localization processing circuit is configured to perform angle of arrival estimation calculations between respective antenna array elements of the phased antenna array and the phase control unit is configured to implement phase shifts to assist beam steering of the phased antenna array.

11. The communication unit of claim 9 wherein localization processing circuit is configured to perform a wireless self-distance measurement between the plurality of cascaded mmW TRx circuits based on a determined round trip time of flight measurement that provides distance information between respective array antenna elements of the phased antenna array.

12. The communication unit of claim 1 wherein the localization processing circuit is configured, in response to a requirement to achieve high distance measurement accuracy, to employ laser technology to facilitate a distance measurement.

13. A method for cascading a plurality of millimetre wave, mmW, transceiver, TRx, circuits in a communication unit, where each circuit comprising at least one phase shift circuit and each coupled to respective antennas, wherein the method comprises:
   processing transmit and receive signals of the plurality of cascaded mmW TRx circuits;
   wirelessly transmitting a signal from a first TRx circuit of the plurality of cascaded mmW TRx circuits to a second TRx circuit via a respective antenna;
   determining a distance relationship between at least one antenna coupled to the first TRx circuit and at least one antenna coupled to the second TRx circuit by a localization processing circuit operably coupled to at least one of the first TRx circuit and second TRx circuit;
   adjusting the at least one phase shifter by a phase control unit, operably coupled to the localization processing circuit, in response to the distance relationship;
   generating a local oscillator, LO, signal for use by the cascaded mmW TRx circuits in the communication unit; and
   wirelessly distributing control signals within the communication unit by modulating an amplitude of the LO signal.

14. The method of claim 13, wherein the distance relationship comprises one or more of: a geographical distance between a number of the plurality of mmW TRx antennas, a transmission delay between at least a number of the plurality of mmW TRx circuits.

15. The method of claim 13, wherein the respective antennas coupled to the plurality of cascaded mmW TRx circuits are configured to operate as a phased antenna array.

16. The method of claim 15, further comprising:
   performing angle of arrival estimation calculations between respective antenna array elements of the phased antenna array; and
   implementing phase shifts by way of the phase control unit to assist beam steering of the phased antenna array.

17. The method of claim 15, further comprising performing a wireless self-distance measurement between the plurality of cascaded mmW TRx circuits based on a determined round trip time of flight measurement that provides distance information between respective array antenna elements of the phased antenna array.

18. The method of claim 13, further comprising generating by way of a master transceiver circuit a signal modulation and broadcast a transmit signal via an intermediate-frequency signal to the plurality of cascaded mmW TRx circuits at a fraction of the transmit frequency power in order to avoid interfering with a normal operation mode.

* * * * *